United States Patent
Sakata et al.

(10) Patent No.: US 10,921,698 B2
(45) Date of Patent: Feb. 16, 2021

(54) LIGHT SOURCE DEVICE, PROJECTOR, AND PHOSPHOR ROD

(71) Applicant: SEIKO EPSON CORPORATION, Tokyo (JP)

(72) Inventors: Hidefumi Sakata, Kamiina-gun (JP); Junichi Suzuki, Matsumoto (JP); Shingo Komiyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/737,976

(22) Filed: Jan. 9, 2020

(65) Prior Publication Data
US 2020/0225565 A1    Jul. 16, 2020

(30) Foreign Application Priority Data

Jan. 10, 2019    (JP) ................. 2019-002413

(51) Int. Cl.
*G03B 21/20*    (2006.01)

(52) U.S. Cl.
CPC ....... *G03B 21/204* (2013.01); *G03B 21/2066* (2013.01)

(58) Field of Classification Search
None
See application file for complete search history.

(56) References Cited

U.S. PATENT DOCUMENTS

| | | | |
|---|---|---|---|
| 2016/0084452 A1* | 3/2016 | Hikmet ................ | G03B 21/204 362/19 |
| 2016/0131813 A1* | 5/2016 | Hikmet ................ | G02B 6/0041 362/611 |

FOREIGN PATENT DOCUMENTS

WO    2006/054203 A1    5/2006

* cited by examiner

*Primary Examiner* — Elmito Breval
(74) *Attorney, Agent, or Firm* — Oliff PLC

(57) ABSTRACT

A light source device according to the present disclosure includes a light source configured to emit excitation light, a first rod part including a phosphor and configured to emit fluorescence in response to incidence of the excitation light, a second rod part located in parallel to the first rod part, including a phosphor, and configured to emit fluorescence in response to incidence of the excitation light, a first reflecting film disposed so as to be opposed to a tilted surface formed in an end part of the first rod part, and a second reflecting film disposed so as to be opposed to a tilted surface formed in an end part of the second rod part.

13 Claims, 7 Drawing Sheets

LIGHT SOURCE DEVICE, PROJECTOR, AND PHOSPHOR ROD

The present application is based on, and claims priority from JP Application Ser. No. 2019-002413, filed Jan. 10, 2019, the disclosure of which is hereby incorporated by reference herein in its entirety.

BACKGROUND

1. Technical Field

The present disclosure relates to a light source device, a projector, and a phosphor rod.

2. Related Art

As a light source device used for a projector, there is proposed a light source device using fluorescence emitted from a phosphor when irradiating the phosphor with excitation light emitted from a light emitting element. In International Publication No. WO 2006/054203 (Document 1), there is disclosed a light source device which is provided with a wavelength conversion member including a phosphor and shaped like a flat plate, and a light emitting diode (LED) for emitting the excitation light, and makes the excitation light enter the wavelength conversion member from a surface large in area out of the plurality of surfaces of the wavelength conversion member to emit the converted light from a surface small in area of the wavelength conversion member.

As described in Document 1, by making the excitation light emitted from the LED enter the wavelength conversion member, it is possible to obtain light different in wavelength from the light emitted from the LED. For example, when the wavelength conversion member includes a yellow phosphor, it is possible to obtain yellow light from blue light as the excitation light emitted from the LED. When attempting to obtain light high in luminance in this configuration, it is necessary to take a measure such as increasing the size of the wavelength conversion member and at the same time increasing the number of excitation light sources. In this case, there occurs a negative effect of growth in size of the light source device. Further, when the wavelength conversion member grows in size, the area of the light exit surface of the wavelength conversion section also increases, and therefore, there occurs a negative effect that the etendue increases, and the use efficiency of the light emitted decreases.

SUMMARY

A light source device according to an aspect of the present disclosure includes a light source configured to emit excitation light, a first rod part including a phosphor and configured to emit fluorescence in response to incidence of the excitation light, a second rod part located in parallel to the first rod part, including a phosphor, and configured to emit fluorescence in response to incidence of the excitation light, a first reflecting film disposed so as to be opposed to a tilted surface formed in an end part of the first rod part, and a second reflecting film disposed so as to be opposed to a tilted surface formed in an end part of the second rod part, wherein the fluorescence is generated in the first rod part and the second rod part in response to the excitation light entering the first rod part and the second rod part, and the fluorescence is emitted from a light exit surface provided to the first rod part.

A projector according to another aspect of the present disclosure includes the light source device according to the above aspect of the present disclosure, a light modulation device configured to modulate light from the light source device in accordance with image information, and a projection optical device configured to project the light modulated by the light modulation device.

A phosphor rod according to another aspect of the present disclosure includes a first rod part including a phosphor, a second rod part including a phosphor, a first tilted surface formed in an end part of the first rod part, a second tilted surface formed in an end part of the second rod part, and a bond part disposed between the end part of the first rod part and the end part of the second rod part, and configured to bond the end part of the first rod part and the end part of the second rod part to each other.

A phosphor rod according to another aspect of the present disclosure includes a first rod part including a phosphor, a second rod part including a phosphor, a first tilted surface formed in an end part of the first rod part, a second tilted surface formed in an end part of the second rod part, and a first protruding part disposed at a position opposed to the first tilted surface in the end part of the first rod part, wherein the first protruding part is bonded to the end part of the second rod part.

A phosphor rod according to another aspect of the present disclosure includes a first rod part including a phosphor, a second rod part including a phosphor, a first tilted surface formed in an end part of the first rod part, a second tilted surface formed in an end part of the second rod part, a first protruding part disposed at a position opposed to the first tilted surface in the end part of the first rod part, and a second protruding part disposed at a position opposed to the second tilted surface in the end part of the second rod part, wherein the first protruding part and the second protruding part are bonded to each other.

DESCRIPTION OF EXEMPLARY EMBODIMENTS

First Embodiment

Hereinafter, a first embodiment of the present disclosure will be described using FIG. 1 through FIG. 3.

A projector according to the present embodiment is an example of a projector using liquid crystal panels as light modulation devices. It should be noted that in each of the drawings described below, the constituents are shown with the scale ratios of respective sizes set differently between the constituents in some cases in order to facilitate the visualization of each of the constituents.

Figure 1:
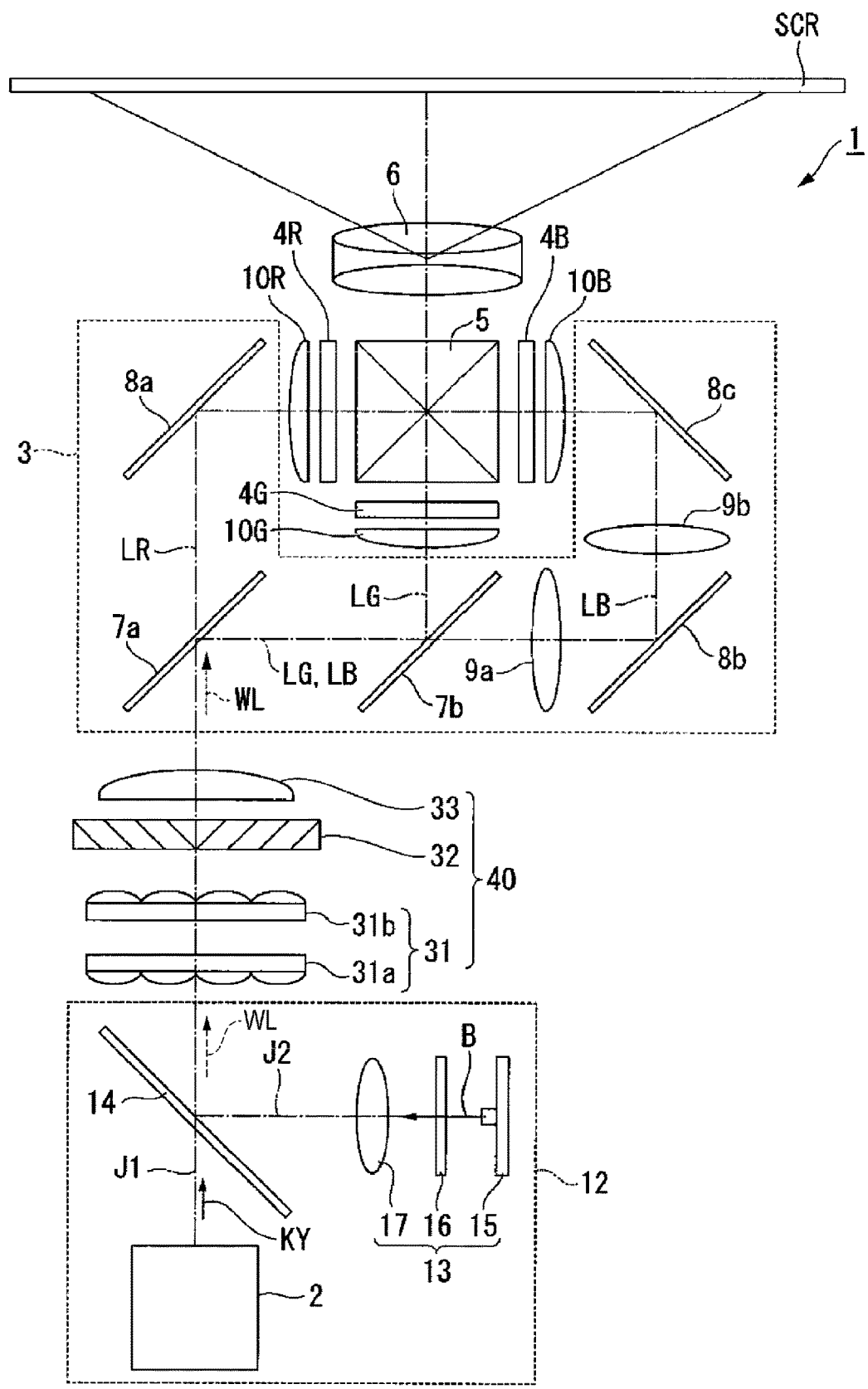
FIG. 1 is a schematic configuration diagram of a projector according to a first embodiment.

FIG. 1 is a schematic configuration diagram of the projector 1 according to the first embodiment.

The projector 1 according to the first embodiment is a projection-type image display device for projecting a color image on a screen (a projection target surface) SCR. The projector 1 uses three light modulation devices 4R, 4G, and 4B corresponding to respective colored light, namely red light LR, green light LG, and blue light LB.

As shown in FIG. 1, the projector 1 is provided with an illumination device 12, a homogenous illumination optical system 40, a color separation optical system 3, the light modulation device 4R, the light modulation device 4G, the light modulation device 4B, a combining optical system 5, and a projection optical device 6.

The illumination device 12 emits illumination light WL as white light toward the homogenous illumination optical system 40. The detailed configuration of the illumination device 12 will be described later in detail.

The homogenous illumination optical system 40 is provided with an integrator optical system 31, a polarization conversion element 32, and a superimposing optical system 33. The integrator optical system 31 is provided with a first lens array 31a and a second lens array 31b. The homogenous illumination optical system 40 homogenizes the intensity distribution of the illumination light WL emitted from the illumination device 12 in each of the light modulation device 4R, the light modulation device 4G, and the light modulation device 4B as illumination target areas. The illumination light WL having been emitted from the homogenous illumination optical system 40 enters the color separation optical system 3.

The color separation optical system 3 separates the illumination light WL as the white light into the red light LR, the green light LG, and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the illumination device 12 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected by the second reflecting mirror 8b and the third reflecting mirror 8c toward the light modulation device 4B. Further, the green light LG is reflected by the second dichroic mirror 7b toward the light modulation device 4G.

The first relay lens 9a and the second relay lens 9b are disposed on the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of the liquid crystal panel, there are disposed polarization plates (not shown), respectively, and thus, there is formed a configuration of transmitting only the linearly polarized light with a specific direction.

On the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB entering the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The illumination device 12 will hereinafter be described.

The illumination device 12 is provided with a light source device 2, a blue light source section 13, and a light combining element 14.

Figure 2:
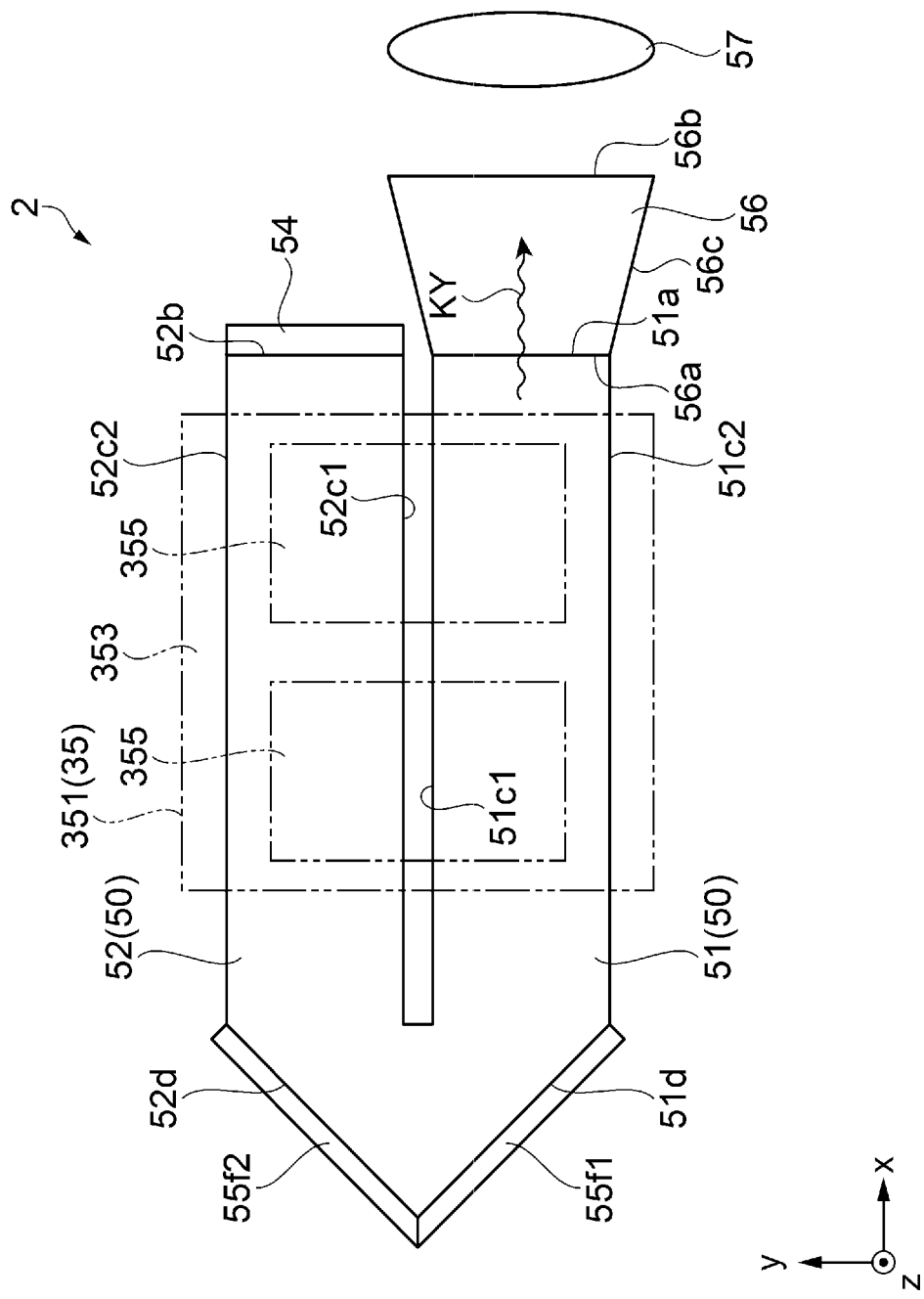
FIG. 2 is a schematic configuration diagram of a light source device according to the first embodiment.

FIG. 2 is a schematic configuration diagram of the light source device 2.

Figure 3:
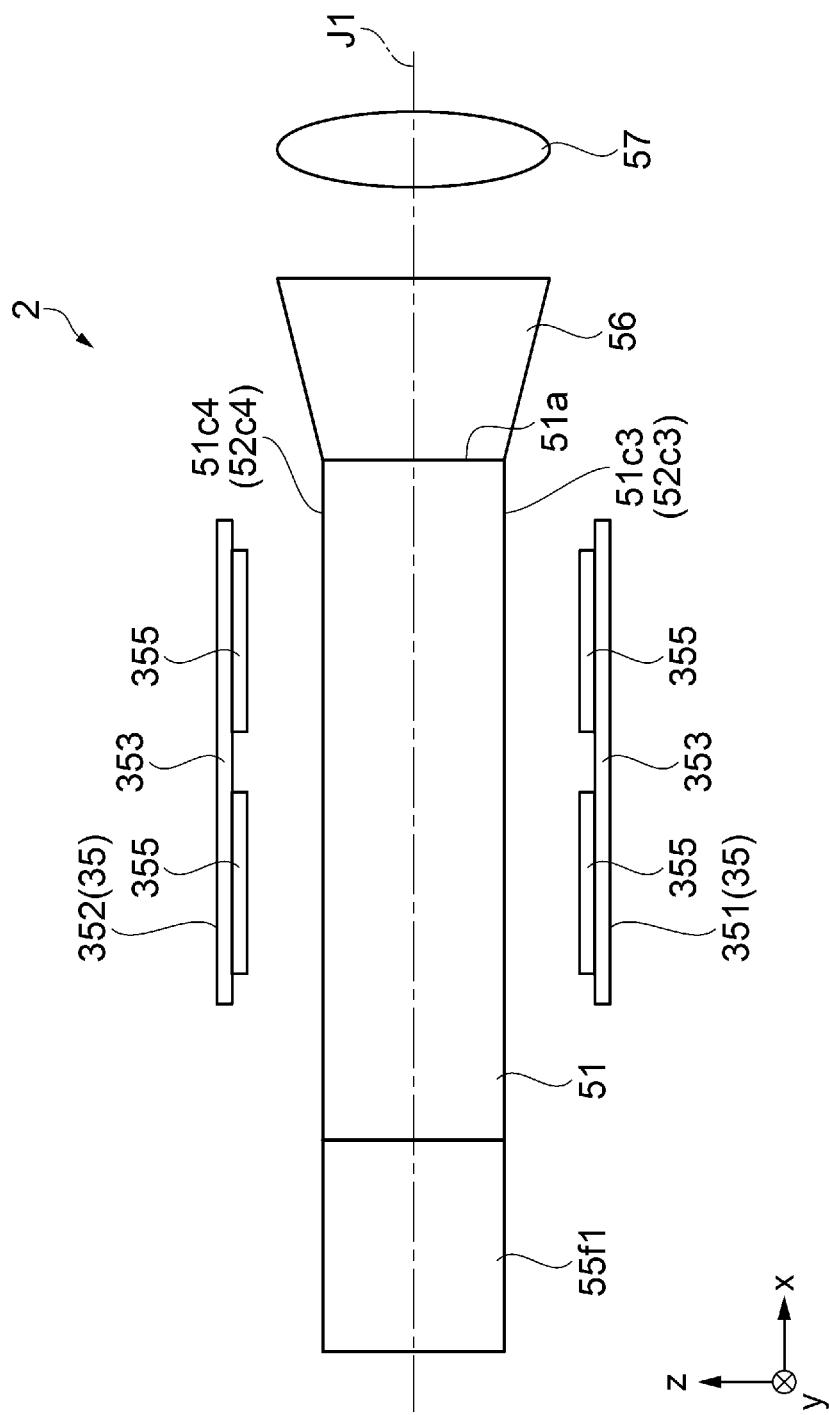
FIG. 3 is a side view of the light source device shown in FIG. 2.

FIG. 3 is a side view of the light source device 2 when viewed from a negative y direction along the y axis in FIG. 2.

As shown in FIG. 2 and FIG. 3, the light source device 2 is provided with a phosphor rod 50, a light source 35, a mirror 54 (a reflecting section), an angle conversion element 56, and a collimator lens 57.

The phosphor rod 50 has a first rod part 51 and a second rod part 52 arrange in parallel to each other. The first rod part 51 and the second rod part 52 will hereinafter be referred to as the rod parts 51, 52 in some cases. The first rod part 51 and the second rod part 52 are each shaped like a quadrangular prism. The first rod part 51 has a first end surface 51*a*, and four side surfaces 51*c*1, 51*c*2, 51*c*3, and 51*c*4. In the phosphor rod 50, fluorescence KY is emitted from the first end surface 51*a*. It should be noted that it is possible to assume the central axis of the first rod part 51 as an optical axis J1 of the light source device 2. The fluorescence emitted inside the phosphor rod 50 is emitted toward the direction of the optical axis J1 from the first end surface 51*a*. In other words, the first end surface 51*a* is a light exit surface provided to the first rod part 51.

The second rod part 52 is shaped like a quadrangular prism, and has a second end surface 52*b*, and four side surfaces 52*c*1, 52*c*2, 52*c*3, and 52*c*4.

In the present embodiment, the first rod part 51 and the second rod part 52 have substantially the same dimensions. A dimension A in the longitudinal direction (an x direction in the drawing) of the first rod part 51 is longer than a dimension B in the width direction (a y direction in the drawing) of the first rod part 51. For example, the dimension A is substantially ten through several tens times as large as the dimension B. Substantially the same as the first rod part 51 applies also to the second rod part 52. Further, the two rod parts 51, 52 are formed so as to be adjacent to each other.

It should be noted that each of the rod parts 51, is not necessarily required to have the quadrangular prismatic shape, but can also have other polygonal shapes such as a triangular prismatic shape. Alternatively, it is also possible for each of the rod parts 51, 52 to have a columnar shape.

The first rod part 51 and the second rod part 52 are formed at a distance so that the side surface 51*c*1 of the first rod part 51 and the side surface 52*c*1 of the second rod part 52 are opposed to each other. On the other hand, the side surface 51*c*2 of the first rod part 51 and the side surface 52*c*2 of the second rod part 52 are located at the sides opposite to each other. In other words, the two rod parts 51, 52 are arranged in parallel to each other.

It should be noted that a gap located between the first rod part 51 and the second rod part 52 forms an air layer. Therefore, due to a difference in refractive index between the rod part and the air layer, the light propagating through the rod part is reflected on an interface between the rod part and the air layer.

As shown in FIG. 3, the light source 35 is provided with a first light source 351 and a second light source 352. The first light source 351 and the second light source 352 will hereinafter be referred to as light sources 351, 352 in some cases. The first light source 351 is disposed at a position opposed to the side surface 51*c*3 of the first rod part 51 and the side surface 52*c*3 of the second rod part 52. The second light source 352 is disposed at a position opposed to the side surface 51*c*4 of the first rod part 51 and the side surface 52*c*4 of the second rod part 52. The light source 35 emits the excitation light.

The first light source 351 and the second light source 352 have the same configuration, and are each provided with a substrate 353, and a plurality of light emitting diodes (LED) 355 mounted on one surface of the substrate 353, the one surface being opposed to the rod parts 51, 52. In the drawings, each of the light sources 351, 352 are drawn so as to be provided with two LED 355, but the number of the LED 355 is not particularly limited. The LED 355 emit the excitation light. It is sufficient for the wavelength band of the excitation light to be the ultraviolet wavelength band of, for example, 200 nm through 380 nm, a violet wavelength band around 400 nm, or a blue wavelength band. It should be noted that each of the light sources 351, 352 can also be provided with other optical members such as a light guide plate, a diffusion plate, or a lens besides the substrate 353 and the LED 355.

Each of the LED 355 is disposed at a position opposed to both of the first rod part 51 and the second rod part 52. In other words, each of the LED 355 is disposed so as to straddle the first rod part 51 and the second rod part 52, and functions as both of the light source for the excitation light for the first rod part 51 and the light source for the excitation light for the second rod part 52. Therefore, the excitation light in the same wavelength band enters the first rod part 51 and the second rod part 52. The excitation light enters the first rod part 51 from the side surfaces 51*c*3, 51*c*4 of the first rod part 51, and at the same time, enters the second rod part 52 from the side surfaces 52*c*3, 52*c*4 of the second rod part 52.

It should be noted that it is possible for the light source 35 to individually be provided with an LED disposed at a position opposed to the first rod part 51 and an LED disposed at a position opposed to the second rod part 52. In that case, the wavelength band of the excitation light entering the first rod part 51 and the wavelength band of the excitation light entering the second rod part 52 can also be different from each other.

The first rod part 51 includes a ceramic phosphor (a first phosphor) for performing wavelength conversion from the excitation light to the fluorescence having a first wavelength band. The first wavelength band is a yellow wavelength band of, for example, 490 through 750 nm. The fluorescence is emitted from the first end surface 51*a* of the first rod part 51.

The second rod part 52 includes a ceramic phosphor (a second phosphor) for performing wavelength conversion from the excitation light to the fluorescence having a second wavelength band. The second wavelength band is the yellow wavelength band of, for example, 490 through 750 nm. Therefore, the fluorescence emitted from the first rod part 51 and the second rod part 52 is yellow light.

It should be noted that it is also possible for each of the rod parts 51, 52 to be formed of a single-crystal phosphor instead of the ceramic phosphor (a polycrystalline phosphor). Alternatively, it is also possible for each of the rod parts 51, 52 to be formed of fluorescent glass. Alternatively, it is also possible for each of the rod parts 51, 52 to be formed of a material obtained by dispersing a number of phosphor particles in a binder made of glass or resin.

Each of the rod parts 51, 52 includes, for example, an yttrium aluminum garnet (YAG) phosphor as the yellow phosphor. Citing YAG:Ce including cerium (Ce) as an activator agent as an example, as the material of the yellow phosphor, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. The types of the phosphors included in each of the rod parts 51, 52 are preferably the same, but can also be different from each other.

The mirror 54 is a reflecting film disposed so as to be opposed to a second end surface 52*b* of the second rod part 52. Specifically, it is desirable for the mirror 54 to be disposed so as to have contact with the second end surface 52*b*. However, it is also possible for the mirror 54 to be disposed at a small distance with the second end surface 52*b*. Alternatively, it is also possible for the mirror 54 to directly be stacked on the second end surface. The mirror 54 reflects the fluorescence propagating inside the second rod part 52. The mirror 54 is formed of a metal film or a dielectric multilayer film disposed on the second end surface 52b of the second rod part 52.

In the first rod part 51, in the end part on the opposite side to the first end surface 51a, there is formed a first tilted surface 51d crossing the side surface 51c2. Further, in the second rod part 52, in the end part on the opposite side to the second end surface 52b, there is formed a second tilted surface 52d crossing the side surface 52c2. Further, as shown in the drawing, the first rod part 51 and the second rod part 52 are integrally molded in the state in which end parts of the first rod part 51 and the second rod part 52 are coupled to each other. In other words, the phosphor rod 50 shown in FIG. 2 is molded as an integrated structure. It should be noted that the phosphor rod 50 having such a shape as shown in FIG. 2 can be formed by, for example, grinding a bulk polycrystalline phosphor.

Further, a first reflecting film 55/1 is disposed so as to be opposed to the first tilted surface 51d. Further, a second reflecting film 55/2 is disposed so as to be opposed to the second tilted surface 52d. More specifically, it is desirable for the first reflecting film 55/1 to be disposed so as to have contact with the first tilted surface 51d. However, it is also possible for the first reflecting film 55/1 to be disposed at a small distance with the first tilted surface 51d. Alternatively, it is also possible for the first reflecting film 55/1 to directly be stacked on the first tilted surface 51d. It should be noted that the same applies also to an arrangement of the second reflecting film 55/2. Hereinafter, the first reflecting film 55/1 and the second reflecting film 55/2 are referred to as reflecting films 55/1, 55/2 in some cases.

It is also possible for each of the first reflecting film 55/1 and the second reflecting film 55/2 to be a metal reflecting film made of aluminum or silver, or a reflecting film formed of a dielectric multilayer film.

By disposing the two reflecting films described above, there is exerted the function of folding the light path of the fluorescence having propagated from the second rod part 52 as much as 180° and then emitting the fluorescence toward the first rod part 51. Specifically, by sequentially reflecting the fluorescence with the two reflecting films 55/1, 55/2, the light path of the fluorescence is folded as much as 180°.

The angle conversion element 56 is disposed on the first end surface 51a of the first rod part 51. The angle conversion element 56 is formed of a taper rod having an end plane of incidence of light 56a which the fluorescence KY enters, and a light exit end surface 56b from which the fluorescence KY is emitted. The angle conversion element 56 has a truncated quadrangular pyramid shape, and the cross-sectional area perpendicular to the optical axis J1 increases along the proceeding direction of the fluorescence KY, and the area of the light exit end surface 56b is larger than the area of the end plane of incidence of light 56a. Thus, the fluorescence KY changes the angle to the direction parallel to the optical axis J1 every time the fluorescence KY is totally reflected by a side surface 56c while proceeding inside the angle conversion element 56. In such a manner, the angle conversion element 56 makes the diffusion angle of the fluorescence KY in the light exit end surface 56b smaller than the diffusion angle of the fluorescence KY in the end plane of incidence of light 56a.

The angle conversion element 56 is disposed so that the end plane of incidence of light 56a is opposed to the first end surface 51a of the first rod part 51. It is also possible for the angle conversion element 56 and the first rod part 51 to have contact with each other via an optical adhesive. It is desirable not to provide an air gap (an air layer) between the angle conversion element 56 and the first rod part 51.

It should be noted that the angle conversion element 56 can also be fixed so as to have direct contact with the first rod part 51 by, for example, an arbitrary support member. In any case, it is desirable not to dispose an air gap between the angle conversion element 56 and the first rod part 51. Further, it is desirable to make the refractive index of the angle conversion element 56 and the refractive index of the first rod part 51 coincide with each other as precise as possible.

Further, it is also possible to use a compound parabolic concentrator (CPC) as the angle conversion element 56 instead of the taper rod. When using the CPC as the angle conversion element 56, it is also possible to obtain substantially the same advantages as those when using the taper rod.

The collimator lens 57 is disposed on the light exit side of the light exit end surface 56b of the angle conversion element 56. The collimator lens 57 collimates the fluorescence KY emitted from the angle conversion element 56. In other words, the parallelism of the fluorescence KY the angle distribution of which is converted by the angle conversion element 56 is further improved by the collimator lens 57. The collimator lens 57 is formed of a convex lens. It should be noted that when sufficient parallelism is obtained by the angle conversion element 56 alone, it is not necessarily required to provide the collimator lens 57.

As shown in FIG. 1, the blue light source section 13 is provided with a semiconductor laser 15, a diffusion plate 16, and a condenser lens 17. An axis perpendicular to the optical axis J1 of the light source device 2, and passing through the center of the light combining element 14 is defined as an optical axis J2 of the blue light source section 13. The semiconductor laser 15, the diffusion plate 16, and the condenser lens 17 are arranged on the optical axis J2 in this order from a far side to a near side with respect to the color combining element 14.

The semiconductor laser 15 emits blue light B having a predetermined wavelength band toward the diffusion plate 16. The wavelength band of the blue light is, for example, 440 nm through 480 nm. It should be noted that it is also possible to use a plurality of semiconductor lasers arranged in an array, for example, as the semiconductor laser 15.

The diffusion plate 16 is disposed on a light exit side of the semiconductor laser 15. The diffusion plate 16 diffuses the blue light B emitted from the semiconductor laser 15. The diffusion plate 16 is constituted by, for example, a microlens array, a holographic diffuser, a ground glass having a surface provided with asperity or a fly-eye lens constituted by two microlens arrays. The diffusion angle distribution of the blue light B having been transmitted through the diffusion plate 16 becomes broader than the diffusion angle distribution of the blue light B which has not been transmitted through the diffusion plate 16. Thus, it is possible to increase the diffusion angle of the blue light B to an equivalent level to the diffusion angle of the fluorescence KY. As a result, it is possible to suppress the color unevenness of the illumination light WL due to the fact that the diffusion angle of the blue light B and the diffusion angle of the fluorescence KY are different from each other. Further, by using the diffusion plate 16, it is possible to suppress the speckle which is apt to be caused by the laser beam.

It should be noted that it is also possible for the diffusion plate 16 to be configured so as to be rotatable around the rotational axis crossing a plate surface of the diffusion plate 16. Thus, the speckle can effectively be suppressed.

The condenser lens 17 is disposed on a light exit side of the diffusion plate 16. The condenser lens 17 converges the blue light B emitted from the diffusion plate 16 toward the light combining element 14. The condenser lens 17 is formed of a convex lens.

The light combining element 14 is disposed on the light exit side of the light source device 2 and the blue light source section 13. The light combining element 14 is formed of a dichroic mirror. The dichroic mirror transmits the fluorescence KY as the yellow light emitted from the light source device 2, and reflects the blue light B emitted from the blue light source section 13. Thus, the light combining element 14 generates the illumination light WL as the white light obtained by combining the fluorescence KY as the yellow light and the blue light B with each other.

Hereinafter, the behavior of the light in the light source device 2 according to the present embodiment will be described.

When the excitation light emitted from the LED 355 enters the second rod part 52, the second phosphor included in the second rod part 52 is excited, and thus, the fluorescence is emitted. The fluorescence proceeding toward the side surfaces 52c1, 52c2, 52c3, and 52c4 propagates while repeating total reflection by the side surfaces 52c1, 52c2, 52c3, and 52c4. It should be noted that the fluorescence having proceeded toward the second end surface 52b is reflected by the mirror 54.

Further, the fluorescence is sequentially reflected by the first reflecting film 55f1 and the second reflecting film 55f2 to thereby fold the light path, and thus, the fluorescence enters the first rod part 51.

On the other hand, when the excitation light emitted from the LED 355 enters the first rod part 51, the first phosphor included in the first rod part 51 is excited, and thus, the fluorescence is emitted. The fluorescence proceeding toward the side surfaces 51c1, 51c2, 51c3, and 51c4 propagates while repeating total reflection by the side surfaces 51c1, 51c2, 51c3, and 51c4. The fluorescence having proceeded toward the first end surface 51a is emitted from the first end surface, and then enters the angle conversion element 56. The fluorescence having proceeded toward the opposite direction to the above enters the second rod part 52, and is then reflected by the mirror 54 of the second end surface 52b, and reenters the first rod part 51 via the two reflecting films 55f1, 55f2.

In such a manner, the fluorescence having propagated through the rod parts 51, 52 is finally emitted from the first end surface 51a to turn to the fluorescence KY. Then, the fluorescence KY enters the angle conversion element 56. The fluorescence KY is collimated by the angle conversion element 56 and the collimator lens 57, and is then emitted from the light source device 2. The fluorescence KY (the illumination light WL) having been emitted from the light source device 2 proceeds toward the integrator optical system 31 as shown in FIG. 1.

In the light source device 2 according to the present embodiment, the first rod part 51 and the second rod part 52 are arranged so that the side surfaces 51c1, 52c1 are opposed to each other. Further, the first light source 351 and the second light source 352 are disposed at positions opposed to the side surfaces 51c3, 51c4 of the first rod part 51 and the side surfaces 52c3, 52c4 of the second rod part 52. Thus, the light source device 2 small in size can be realized.

In particular in the case of the present embodiment, since the two rod parts 51, 52 are arranged in parallel to each other, it is possible to make the size in the longitudinal direction of the light source device 2 substantially half compared to when arranging the two rod parts in series.

Further, the light emitted from the LED is generally scattering light, and is therefore large in diffusion angle. Therefore, the light source using the LED tends to be large in etendue determined by the product of the light emitting area of the light source and the solid angle of the light from the light source. The increase in etendue of the light source device increases the light which cannot be taken by the optical system in the posterior stage of the light source device to cause deterioration of the light use efficiency as the projector. Therefore, when used as the light source device for the projector, it is desirable for the etendue to be as small as possible.

In contrast, in the case of the light source device 2 according to the present embodiment, the light large in scattering angle emitted from the LED 355 enters the rod parts 51, 52 from the side surface large in area. Meanwhile, the fluorescence KY is emitted from the first end surface 51a sufficiently smaller in area compared to the side surfaces of the rod parts 51, 52. As described above, according to the present embodiment, it is possible to substantively decrease the light emitting area, and thus it is possible to realize the light source device 2 small in etendue. As a result, by using this light source device 2 in the projector 1, it is possible to improve the light use efficiency in the optical system in the posterior stage of the light source device 2.

Further, in the phosphor rod 50 according to the present embodiment, since there are two rod parts, it is possible to further decrease the etendue compared to the related art having just one rod part. In other words, when assuming that the fluorescence the same in luminance is emitted from the rod parts the same in luminance, since it is possible to make the cross-sectional area of the rod part smaller in the configuration of the present disclosure, and as a result, it is possible to obtain an advantage of decreasing the etendue.

On the other hand, in the present disclosure, since the two rod parts are provided, it is also possible to obtain an advantage that the luminance of the fluorescence emitted from the phosphor rod is improved compared to the related art. In other words, when using the two rod parts having the same cross-sectional area as when using the just one rod part, the luminance of the fluorescence emitted from the rod part increases compared to when using just one rod part. It should be noted that in this case, the etendue becomes equivalent to that in the related art.

In the illumination device 12 of the present embodiment, the blue light B is emitted from the blue light source section 13, the fluorescence KY as the yellow light is emitted from the light source device 2, and the illumination light WL as the white light is obtained by the light combining element 14 combining the blue light B and the fluorescence KY with each other. Therefore, by adjusting the balance between the intensity of the blue light B and the intensity of the fluorescence KY as the yellow light, it is possible to adjust the white balance of the illumination light WL.

In the light source device 2 according to the present embodiment, since the LED 355 are arranged so as to straddle the side surfaces 51c3, 51c4 of the first rod part 51 and the side surfaces 52c3, 52c4 of the second rod part 52, one LED 355 is used commonly by the two rod parts. Thus, the number of the LED 355 can be suppressed to the minimum, and it is possible to simplify the configuration of the light source 35.

In the light source device 2 according to the present embodiment, since the angle conversion element 56 is disposed on the light exit side of the first rod part 51, it is possible to collimate the fluorescence KY emitted from the first rod part 51. Further, since the collimator lens 57 is disposed on the light exit side of the angle conversion element 56, it is possible to further improve the parallelism of the fluorescence KY. Thus, it is possible to improve the light use efficiency in the optical system in the posterior stage of the light source device 2.

In the light source device 2 according to the present embodiment, since the mirror 54 is disposed so as to be opposed to the second end surface 52*b* of the second rod part 52, the fluorescence is prevented from being emitted from the second end surface 52*b*. Thus, the use efficiency of the fluorescence can be improved.

Further, in the light source device 2 according to the present embodiment, since the side surface 51*c*1 of the first rod part 51 and the side surface 52*c*1 of the second rod part 52 are opposed to each other via the air layer, the reflection of the light on the side surfaces 51*c*1, 52*c*1 of the respective rod parts 51, 52 becomes the total reflection not accompanied by a light loss. Thus, the light use efficiency can be improved. Further, it is desirable for each of the side surfaces of the respective rod parts 51, 52 to smoothly be polished. Thus, the loss of the light can further be suppressed.

It should be noted that it is also possible to dispose a reflecting film formed of, for example, a metal film between the side surface 51*c*1 of the first rod part 51 and the side surface 52*c*1 of the second rod part 52 instead of the gap (the air layer). Further, it is also possible to form a dichroic film for reflecting the yellow light on the side surface 51*c*1 and the side surface 52*c*1.

The projector 1 according to the present embodiment is equipped with the light source device 2 described above, and is therefore excellent in light use efficiency, and at the same time, reduction in size can be achieved.

Modified Example 1

Figure 4:
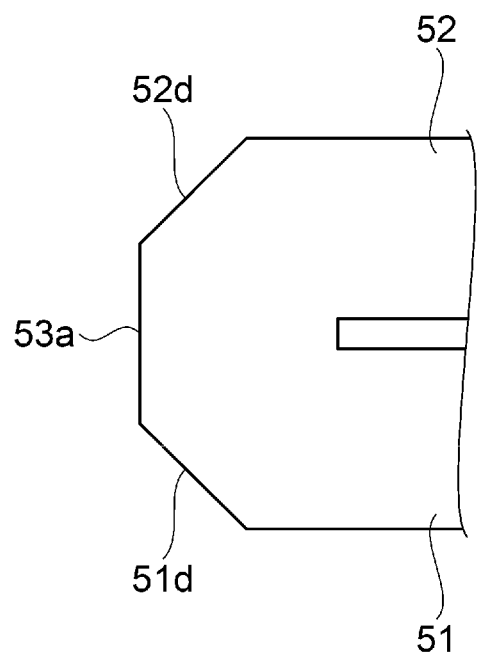
FIG. 4 is a schematic configuration diagram of Modified Example 1 of the first embodiment.

As a modified example of the first embodiment, it is possible to apply such a configuration as shown in FIG. 4. In the present modified example, only the shape of the end part of each of the rod parts 51, 52 is different. Specifically, it is also possible to adopt a shape in which an end surface 53*a* exists between the first tilted surface 51*d* and the second tilted surface 52*d*. Also in this case, it is desirable to dispose a reflecting film so as to be opposed to the first tilted surface 51*d*, the second tilted surface 52*d*, and the end surface 53*a* similarly to the embodiment described above.

Modified Example 2

Figure 5:
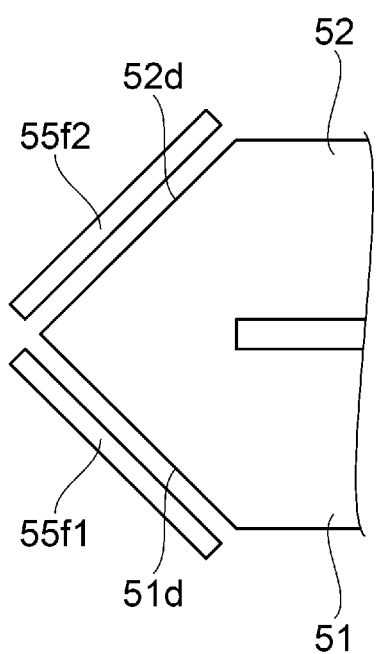
FIG. 5 is a schematic configuration diagram of Modified Example 2 of the first embodiment.

As described above, the first reflecting film 55*f*1 is not necessarily required to have contact with the first tilted surface 51*d*, but can also be slightly separated from the first tilted surface 51*d*. In that case, an air layer exists between the first reflecting film 55*f*1 and the first tilted surface 51*d* as shown in FIG. 5. It should be noted that substantially the same arrangement can also be applied to the second reflecting film 55*f*2.

Second Embodiment

In the first embodiment described above, the phosphor rod 50 is formed by carving out the first rod part 52 and the second rod part 52 from a single bulk. In contrast, the second embodiment is characterized in that the phosphor rod is formed by forming the first rod part and the second rod part as separate members, and then bonding the both members to each other.

Figure 6:
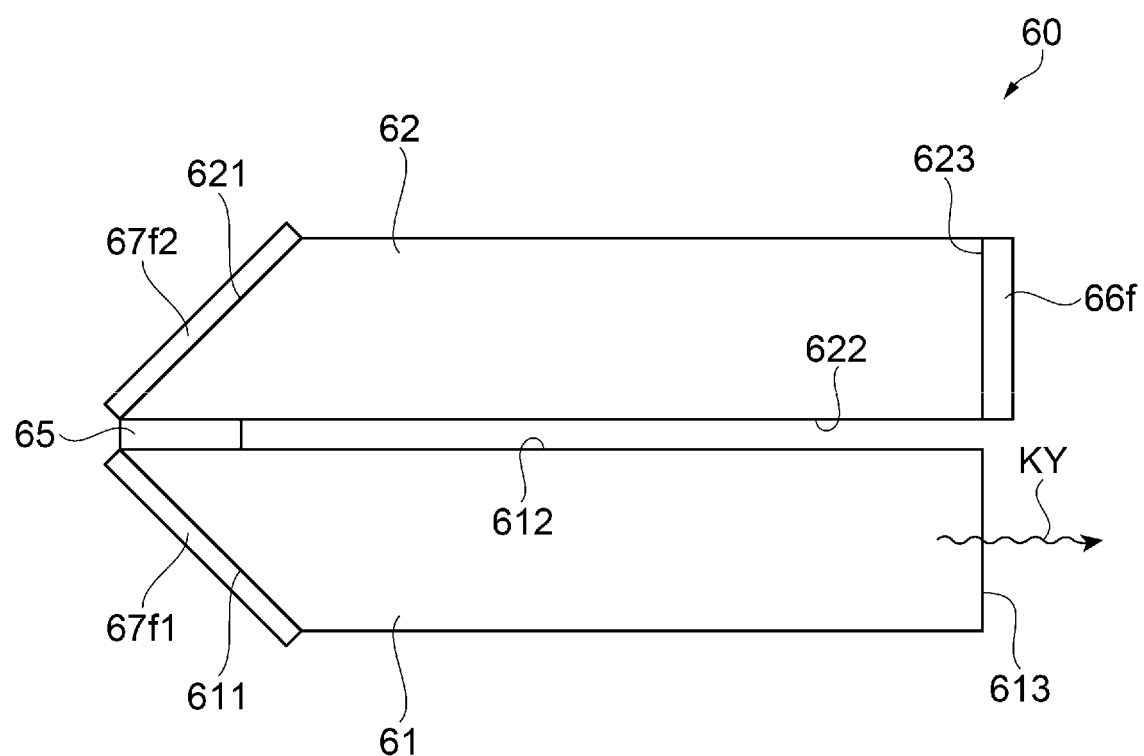
FIG. 6 is a schematic configuration diagram of a phosphor rod according to a second embodiment.

The second embodiment of the present disclosure will hereinafter be described using FIG. 6. It should be noted that the basic configuration of the light source device according to the second embodiment is substantially the same as in the first embodiment. Further, a general shape of the phosphor rod and a function to be exerted are substantially the same as those in the first embodiment. Therefore, in the following description, only the features of the phosphor rod 60 will be mentioned.

The phosphor rod 60 in the second embodiment has a first rod part 61, a second rod part 62, and an adhesive layer 65 for bonding the first rod part 61 and the second rod part 62 to each other. Further, the constituent material of the first rod part 61 and the second rod part 62 is the same as the material of the rod parts in the first embodiment, and is formed of a material including at least a phosphor. The first rod part 61 and the second rod part 62 will hereinafter be referred to as the rod parts 61, 62 in some cases.

It is preferable for the adhesive layer 65 to have a substantially equal refractive index to those of the first rod part 61 and the second rod part 62, and is provided with a light transmissive property. Therefore, transparent resin or glass frit is suitable as the adhesive layer 65. In this case, it is possible to bond the two rod parts to each other by applying the transparent resin or the glass frit to the end part of at least one of the first rod part 61 and the second rod part 62, sticking the end parts of the two rod parts to each other, and then solidifying the transparent resin or the glass frit. Thus, the first rod part 61 and the second rod part 62 are bonded to each other in the state in which a side surface 612 of the first rod part 61 and a side surface 622 of the second rod part 62 are opposed to each other. As described above, the adhesive layer 65 functions as a bond part between the two rod parts 61, 62.

The first rod part 61 has a first end surface 613, and the fluorescence having propagated inside the phosphor rod 60 is emitted from the first end surface 613. It should be noted that the process of the light generation and the light guide of the fluorescence inside the phosphor is substantially the same as in the first embodiment.

In the first rod part 61, an end part on the opposite side to the first end surface 613 is provided with a tilted surface 611. The tilted surface 611 is a surface crossing the side surface 612. The first rod part 61 having such a shape as shown in FIG. 6 can be formed by being carved out from a bulk phosphor.

The second rod part 62 has a second end surface 623, and a mirror 66*f* is disposed so as to be opposed to the second end surface 623. The mirror 66*f* is, for example, a reflecting film, and a metal reflecting film or a dielectric reflecting film can be applied as the mirror 66*f*. Out of the fluorescence propagating through the second rod part 62, the light having proceeded toward the second end surface 623 is reflected by the mirror 66*f*.

Further, the shape of the second rod part 62 is substantially the same as the shape of the first rod part 61, and in the second rod part 62, an end part on the opposite side to the second end surface 623 is provided with a tilted surface 621.

Further, a first reflecting film 67*f*1 is disposed so as to be opposed to the tilted surface 611, and a second reflecting film 67*f*2 is disposed so as to be opposed to the tilted surface 621. Thus, the fluorescence having propagated through the second rod part 62 is reflected by the second reflecting film 67*f*2, then passes through the adhesive layer 65, and is then reflected by the reflecting film 67f1, then propagates to the first rod part 61, and then finally emitted from the first end surface 613 as the fluorescence KY.

Similarly to the first embodiment, it is also possible for the first reflecting film 67f1 and the second reflecting film 67f2 to be formed of metal, or formed of a dielectric film. Further, the first reflecting film 67f1 and the second reflecting film 67f2 are not necessarily required to have contact with the tilted surfaces in the rod, but can also be disposed separately from the tilted surfaces in the rod.

Further, in the present embodiment, as the material of the adhesive layer 65, it is possible to a phosphor made of the same material as that of the rod parts 61, 62 as a substitute for the transparent resin or the glass frit. In other words, it is possible to form a plate made of the same material as that of the rod parts, and then use the plate as the bonding material of the two rod parts. For example, when the rod parts 61, 62 are made of a ceramic phosphor, the plate having the thickness of about 0.5 mm is formed with the ceramic phosphor as the same material, and then the plate is used as the bonding material. As the bonding process of the rod parts, it is possible to form the phosphor rod 60 having such a shape as shown in FIG. 6 by disposing the plate made of the ceramic phosphor between the first rod part 61 and the second rod part 62, and then performing sintering in the state of making the three members adhere to each other.

Further, as the plate for bonding, it is possible to apply a light transmissive member such as glass having an equivalent refractive index to that of the ceramic phosphor as a substitute for the ceramic phosphor.

According to the configuration described hereinabove, also in the phosphor rod 60 in the second embodiment, it is possible to propagate the fluorescence from the second rod part 62 to the first rod part 61 similarly to the first embodiment, and it is possible for the second embodiment to exert substantially the same advantages as those of the first embodiment. Further, by attaching the LED light sources to the phosphor rod 60 similarly to the first embodiment, it becomes possible to use the phosphor rod 60 as the light source device.

Third Embodiment

In the second embodiment, there is used the adhesive layer in order to bond the two rod parts to each other, but in the third embodiment, a manufacturing process of bonding the rod parts without using the adhesive layer will be described. The shape and the function of the phosphor rod 70 to be manufactured in the present embodiment are substantially the same as those in the first embodiment and the second embodiment.

Figure 7A:
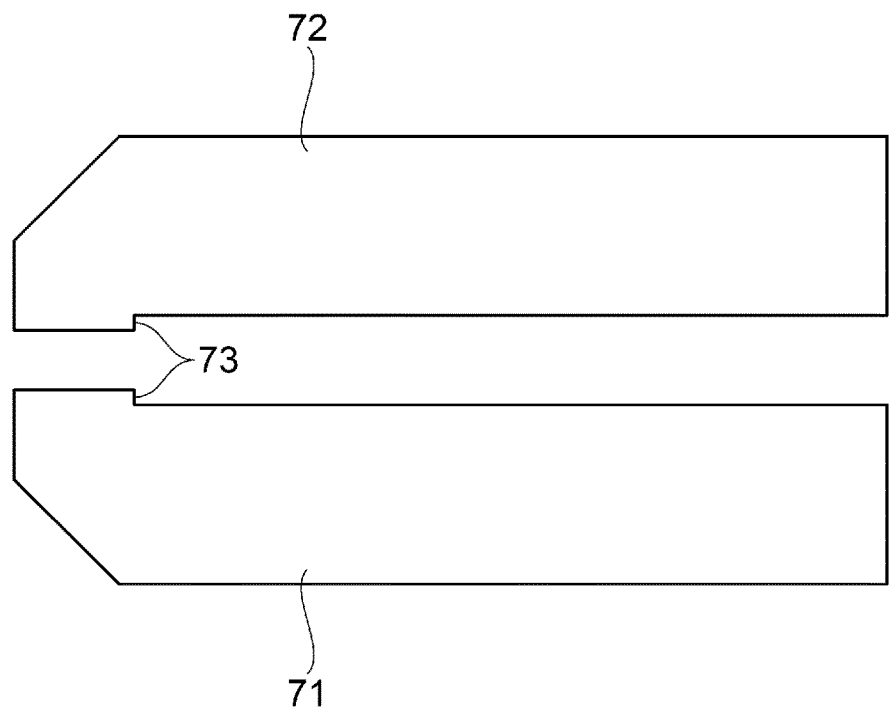
FIG. 7A is a schematic configuration diagram of a phosphor rod according to a third embodiment.
Figure 7B:
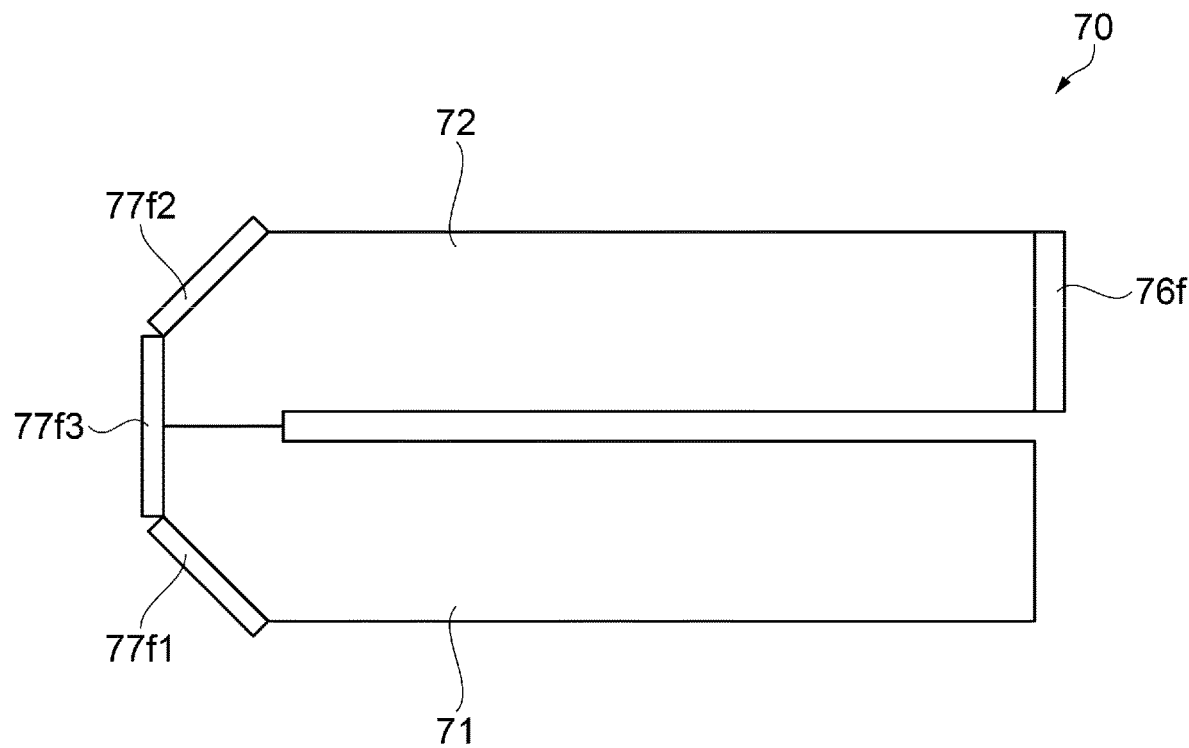
FIG. 7B is a schematic configuration diagram of the phosphor rod according to the third embodiment.

The phosphor rod 70 most suitable for the third embodiment will be described with reference to FIG. 7A and FIG. 7B. FIG. 7A shows a first rod part 71 and a second rod part 72 to be prepared for forming the phosphor rod 70. The first rod part 71 and the second rod part 72 will hereinafter be referred to as the rod parts 71, 72 in some cases. The constituent material of each of the rod parts 71, 72 is the same as in the first and second embodiments. Further, FIG. 7B shows a state in which the two rod parts 71, 72 are bonded to each other to complete the phosphor rod 70. As a method of bonding the two rod parts 71, 72, it is sufficient to apply a phosphor sintering process in the state in which the two rod parts 71, 72 adhere to each other. Thus, since the bonding is achieved by sintering, there is no need to separately provide the adhesive layer.

As shown in FIG. 7A, the rod parts 71, 72 are provided with protruding parts 73 as a first protruding part and a second protruding part in end parts thereof, respectively. In other words, the protruding parts 73 are disposed at positions opposed to tilted surfaces of the rod parts 71, 72, respectively. Further, when bonding the two rod parts 71, 72 to each other, sintering is performed while making the protruding parts 73 of the respective rod parts 71, 72 adhere to each other. Thus, the protruding parts 73 function as the bond part as a result. It should be noted that the protruding parts 73 are provided respectively to the first rod part 71 and the second rod part 72 in the drawings, but it is also possible to adopt a shape in which the protruding part 73 is only provided to one of the two rod parts 71, 72.

Further, as shown in FIG. 7B, a first reflecting film 77f1 is disposed on a tilted surface in the end part of the first rod part 71, and a second reflecting film 77f2 is disposed on a tilted surface in the end part of the second rod part 72. Further, a third reflecting film 77f3 is disposed between the two reflecting films. Further, a fourth reflecting film 76f is disposed as a mirror on the other end part of the second rod part 72. According to this configuration, the phosphor rod 70 has an equivalent function to the function of the phosphor rods 50, 60 in the first and second embodiments as a result. Further, by attaching the LED light sources for emitting the excitation light to the phosphor rod 70, it becomes possible to use the phosphor rod 70 as the light source device.

Fourth Embodiment

Figure 8:
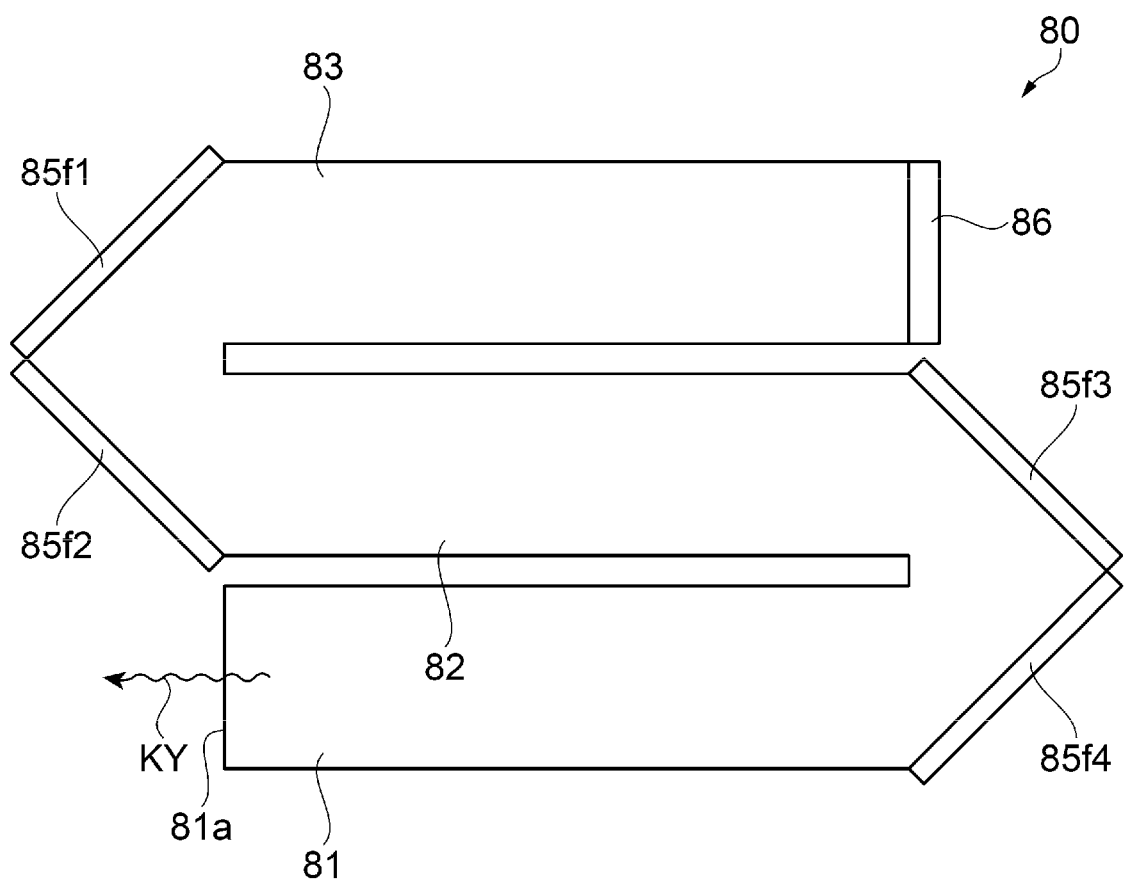
FIG. 8 is a schematic configuration diagram of a phosphor rod according to a fourth embodiment.

A phosphor rod 80 according to the present embodiment is shown in FIG. 8. The phosphor rod 80 is provided with a first rod part 81 and a second rod part 82 substantially the same as the first rod part 51 and the second rod part 52 in the first embodiment, respectively. In addition to this, the present embodiment is characterized in that a third rod part is added. Therefore, the description of the overall configuration of the light source device will be omitted. The first rod part 81, the second rod part 82, and the third rod part 83 will hereinafter be referred to as the rod parts 81, 82, and 83 in some cases.

Similarly to the first rod part 81 and the second rod part 82, the third rod part 83 has a quadrangular prismatic shape.

Similarly to the first rod part 81 and the second rod part 82, the excitation light emitted from the LED light sources enters the third rod part 83. The third rod part includes the phosphor for converting the excitation light into light in the yellow wavelength band of 490 through 750 nm. In other words, the third rod part 83 includes substantially the same phosphor as those of the first rod part 81 and the second rod part 82, and emits the fluorescence as the yellow light.

It should be noted that the LED light sources for emitting the excitation light are disposed at positions opposed to the side surfaces of the respective rod parts 81, 82, and 83. Further, reflecting films 85f1 through 85f4 are disposed so as to be opposed to tilted surfaces in end parts of the rod parts 81, 82, and 83. Further, the point that a mirror 86 is disposed in an end part of the third rod part 83, the point that the fluorescence KY is emitted from an end surface 81a of the first rod part, and so on are substantially the same as those in the first embodiment.

Further, the fluorescence generated in the third rod part 83 is reflected by the reflecting films 85f1, 85f2 disposed on the tilted surface in the end parts of the rod parts, and then propagates to the second rod part 82. In other words, the present embodiment is the same in the propagation of the light as the first embodiment except the fact that the number of the rod parts increases from two to three.

Also in the fourth embodiment, it is possible to obtain substantially the same advantages as in the first embodiment such as the advantage that it is possible to realize the light source device small in size, and the advantage that it is possible to realize the light source device small in etendue.

In particular in the case of the present embodiment, since the three rod parts 81, 82, and 83 for emitting the fluorescence are arranged in parallel to each other, it is possible to make the size in the longitudinal direction of the light source device substantially third compared to when arranging the three rod parts in series.

Further, in the light source device using the phosphor rod 80 in the present embodiment, it is possible to obtain the fluorescence the same in luminance with lower etendue compared to the light source device according to the first embodiment. In other words, since the number of the rod parts has increased, the fluorescence having the equivalent luminance is emitted even when further decreasing the cross-sectional area of each of the rod parts. Therefore, it is possible to realize the further reduction of the etendue compared to the first embodiment.

Although in the embodiments described above, there is described the example when the present disclosure is applied to the transmissive liquid crystal projector, the present disclosure can also be applied to a reflective liquid crystal projector. Here, "transmissive" means that the liquid crystal light valve including the liquid crystal panel and so on has a configuration of transmitting the light. The term "reflective" means that the liquid crystal light valve has a configuration of reflecting the light.

Although in the embodiments described above, there is cited the example of the projector using three liquid crystal panels, the present disclosure can also be applied to a projector using one liquid crystal panel alone or a projector using four or more liquid crystal panels.

Although in the embodiments described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
   a light source configured to emit excitation light;
   a first rod part including a phosphor and configured to emit fluorescence in response to incidence of the excitation light;
   a second rod part located in parallel to the first rod part, including a phosphor, and configured to emit fluorescence in response to incidence of the excitation light;
   a first reflecting film disposed so as to be opposed to a tilted surface formed in an end part of the first rod part; and
   a second reflecting film disposed so as to be opposed to a tilted surface formed in an end part of the second rod part, wherein
   the fluorescence is generated in the first rod part and the second rod part in response to the excitation light entering the first rod part and the second rod part, and the fluorescence is emitted from a light exit surface provided to the first rod part.

2. The light source device according to claim 1, wherein the light exit surface is an end surface located at an opposite side to the end part in the first rod part.

3. The light source device according to claim 1, wherein the first rod part and the second rod part are integrally molded.

4. The light source device according to claim 1, further comprising:
   a bond part disposed between the first rod part and the second rod part, and configured to bond the first rod part and the second rod part to each other.

5. The light source device according to claim 4, wherein the bond part is an adhesive layer, and the adhesive layer includes one of transparent resin and glass frit.

6. The light source device according to claim 4, wherein the bond part is a plate member including a phosphor.

7. The light source device according to claim 4, wherein the bond part is a plate member including glass.

8. The light source device according to claim 1, further comprising:
   a third reflecting film disposed so as to be opposed to an end surface located at an opposite side to the end part of the second rod part.

9. The light source device according to claim 1, further comprising:
   an angle conversion element disposed so as to be opposed to the light exit surface of the first rod part, having an end plane of incidence of light and a light exit end surface, and configured to make a diffusion angle in the light exit end surface smaller than a diffusion angle in the end plane of incidence of light.

10. A projector comprising:
    the light source device according to claim 1;
    a light modulation device configured to modulate light from the light source device in accordance with image information; and
    a projection optical device configured to project the light modulated by the light modulation device.

11. A phosphor rod comprising:
    a first rod part including a phosphor;
    a second rod part including a phosphor;
    a first tilted surface formed in an end part of the first rod part;
    a second tilted surface formed in an end part of the second rod part; and
    a bond part disposed between the end part of the first rod part and the end part of the second rod part, and configured to bond the end part of the first rod part and the end part of the second rod part to each other.

12. A phosphor rod comprising:
    a first rod part including a phosphor;
    a second rod part including a phosphor;
    a first tilted surface formed in an end part of the first rod part;
    a second tilted surface formed in an end part of the second rod part; and
    a first protruding part disposed at a position opposed to the first tilted surface in the end part of the first rod part, wherein
    the first protruding part is bonded to the end part of the second rod part.

13. A phosphor rod comprising:
    a first rod part including a phosphor;
    a second rod part including a phosphor;
    a first tilted surface formed in an end part of the first rod part;
    a second tilted surface formed in an end part of the second rod part;
    a first protruding part disposed at a position opposed to the first tilted surface in the end part of the first rod part; and a second protruding part disposed at a position opposed to the second tilted surface in the end part of the second rod part, wherein the first protruding part and the second protruding part are bonded to each other.

* * * * *